(12) United States Patent
Sauln et al.

(10) Patent No.: US 10,097,685 B2
(45) Date of Patent: Oct. 9, 2018

(54) TELECOMMUNICATIONS PRIVACY METHOD

(71) Applicants: Roger Sauln, Carson City, NV (US); S P Premsuraj, Thiruvananthapuram (IN); Deepak Pradeep, Thiruvananthapuram (IN); Tamojit Sengupta, Thiruvananthapuram (IN)

(72) Inventors: Roger Sauln, Carson City, NV (US); S P Premsuraj, Thiruvananthapuram (IN); Deepak Pradeep, Thiruvananthapuram (IN); Tamojit Sengupta, Thiruvananthapuram (IN)

( * ) Notice: Subject to any disclaimer, the term of this patent is extended or adjusted under 35 U.S.C. 154(b) by 0 days.

(21) Appl. No.: 15/202,548

(22) Filed: Jul. 5, 2016

(65) Prior Publication Data

US 2017/0041461 A1 Feb. 9, 2017

Related U.S. Application Data

(60) Provisional application No. 62/188,705, filed on Jul. 5, 2015.

(51) Int. Cl.
| | |
|---|---|
| *H04M 1/56* | (2006.01) |
| *H04M 15/06* | (2006.01) |
| *H04M 3/42* | (2006.01) |
| *H04W 4/16* | (2009.01) |
| *H04W 4/60* | (2018.01) |

(52) U.S. Cl.
CPC ... *H04M 3/42008* (2013.01); *H04M 3/42059* (2013.01); *H04M 3/42178* (2013.01); *H04W 4/16* (2013.01); *H04W 4/60* (2018.02)

(58) Field of Classification Search
CPC ........ H04M 1/56; H04M 1/571; H04M 1/575; H04M 1/642; H04M 1/665; H04M 15/07; H04M 15/41; H04M 15/43; H04Q 3/72; H04L 12/1439; H04L 12/1471
USPC ............ 379/142.01, 142.06, 142.09, 142.17; 455/415, 566, 567
See application file for complete search history.

(56) References Cited

U.S. PATENT DOCUMENTS

| | | | |
|---|---|---|---|
| 5,590,184 A * | 12/1996 | London .................. | H04M 1/57 379/142.09 |
| 6,574,471 B1 | 6/2003 | Rydbeck | |
| 7,844,040 B2 * | 11/2010 | Sprigg ................... | H04M 3/02 379/142.06 |

(Continued)

FOREIGN PATENT DOCUMENTS

JP 200196734 7/2000

*Primary Examiner* — Binh Kien Tieu
(74) *Attorney, Agent, or Firm* — John D. Long, Esq.; Long & Chybik

(57) ABSTRACT

One embodiment of the invention could be a method of disguising the caller ID of an incoming phone call comprising the following steps: providing a portable telecommunication smart device that interfaces with telecommunication system to receive an incoming phone call; selecting a phone number to be placed upon a fake list manager database and assigning a fake display caller ID to the selected user known phone number; storing the selected phone number and the assigned fake caller display ID upon the fake list manager database, receiving an incoming phone call; matching a phone number of the incoming phone call with selected phone number; displaying the fake caller ID upon portable telecommunication smart device.

20 Claims, 5 Drawing Sheets

(56) References Cited

U.S. PATENT DOCUMENTS

| | | | |
|---|---|---|---|
| 8,064,582 B2 | 11/2011 | Ma et al. | |
| 8,346,871 B2 | 1/2013 | Peters | |
| 8,451,995 B2* | 5/2013 | Canu | H04M 1/56 379/142.05 |
| 8,571,530 B2* | 10/2013 | Heikkila | H04M 1/575 379/142.01 |
| 8,588,387 B2 | 11/2013 | Ma et al. | |
| 8,917,843 B2* | 12/2014 | Sharpe | H04M 3/4365 379/142.15 |
| 2003/0152205 A1* | 8/2003 | Winkler | H04M 1/274558 379/142.06 |
| 2008/0089501 A1* | 4/2008 | Benco | H04M 15/06 379/142.01 |
| 2008/0187117 A1 | 8/2008 | Maugars | |
| 2009/0141895 A1* | 6/2009 | Anderson | G06F 21/84 380/252 |
| 2009/0252303 A1 | 10/2009 | Agarwal | |
| 2011/0142220 A1 | 6/2011 | Cho et al. | |
| 2013/0144951 A1* | 6/2013 | Viswanath | H04L 29/08 709/204 |

\* cited by examiner

TELECOMMUNICATIONS PRIVACY METHOD

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention relates to web-based downloadable software applications for telecommunications capable portable smart devices to protect sensitive information being received by the smart device that could be viewed or other accessed by third parties who are non-authorized users of said telecommunications capable portable smart devices.

BACKGROUND

The proliferation and use of cellular-based portable telecommunications smart devices, (e.g., smart phones, pads and alike) is substantially overtaking, and in some cases totally replacing, the traditional land-based POTTS ("Plain Old Telephone System") of telecommunication means. This proliferation may allow the mobile personal telecommunication devices to be taken into and used in areas that can be seen as being unsecure as compared to the older home or business based sites when POTTS telecommunications devices were fixedly located. As a result, there may be a greater risk that unauthorized third parties can access sensitive personal and financial data through the cellular-based portable telecommunication smart devices by observing (either blatantly or surreptitiously) the information or data as shown onto the device's display screen. There exists a need for management of incoming calls for portable telecommunication smart devices to reduce unwanted information exposure to third parties.

One such possible solution to these issues could be the present invention generally a WEB-based downloadable software program ("app") that can be downloaded into the portable telecommunication smart devices to managing incoming calls. In one version, the app could control the rejections of incoming phone calls whose phone numbers were previously stored by the user on a blacklist manager database to temporarily prevent at that time from the initial identification information (e.g., caller ID) from the incoming phone call to be displayed on the portable telecommunication smart device so that the third party overlooking a visual display of the portable telecommunication smart device could see the displayed identification information.

In another version of the invention, the app could create a cover or fake caller ID directory database for the portable telecommunication smart device. The device user could use the app to store or otherwise assign a cover ID tag for a selected known phone number. When the portable telecommunication smart device receives an incoming phone call from the selected known phone number, the app could display to the device user (and any overlooking third party) the assigned cover ID tag on the portable telecommunication smart device's display screen. The device user knowing the particular assigned cover ID tag would know the true identity of the phone call originator but third parties seeing the display screen (either blatantly or surreptitiously) would not be able to ascertain the true identity of the call originator. The device operator could use the assigned cover ID tag then decide on whether to answer the incoming call or not depending on the situational environment that the operator was in at the time of the incoming phone call.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to control and disguise by a user of an portable telecommunication smart device the ID of incoming calls as received by and visibly displayed on the smart device;

provide a web-based software application that can be downloaded upon a suitable portable telecommunication smart device that sets up an architecture that allows the device user to assign cover IDs to selected known phone numbers, the cover IDs generally are only known to the smart device user so that receipt of the incoming call of the known phone number, the smart device either temporarily rejects the incoming call or allows the receipt of the said incoming call only after visually displaying the assigned cover ID;

the ability to prevent third party from knowing the true identity of a caller of known phone number as the phone number is received by and visually displayed upon a user's portable telecommunication smart device; and to provide a capability of preventing sensitive information about an incoming call from being visually displayed to third parties by a user's portable telecommunication smart device when the user's portable telecommunication smart device receives the incoming call.

These and other advantages may be realized by reference to the remaining portions of the specification, claims, and abstract.

Brief Description of One Embodiment of the Present Invention

One possible embodiment of the invention could be a method of disguising a caller ID of an incoming phone number as received by a portable telecommunication smart device comprising the following steps: providing the portable telecommunication smart device that interfaces with telecommunication system to receive incoming phone calls; selecting a user known phone number stored upon the portable telecommunication smart device's phone contacts database; creating a fake display caller ID to be assigned to the selected user known phone number; storing both the combination of selected user known phone number and the fake caller ID on the fake list manager database in a manner that the fake caller ID is assigned to the selected user known phone number; receiving an incoming phone call from the telecommunications system by the portable telecommunication smart device; comparing a phone number of the incoming phone call with selected user known phone number as listed upon the fake list manager database; and displaying by the assigned fake caller ID or in alternative displaying a true caller ID associated with the incoming phone call by the portable telecommunication smart device.

Another possible embodiment of the invention could be a method of determining whether the caller ID of an incoming phone number is to be displayed by a user's portable telecommunication smart device comprising the following steps: providing the user's portable telecommunication smart device that interfaces with telecommunication system to receive and process incoming phone calls; selecting a user known phone number stored upon the portable telecommunication smart device's phone contacts database; storing the selected user known phone number on the blacklist manager database; receiving an incoming phone call from the telecommunications system by the portable telecommunication smart device; comparing a phone number of the incoming phone call with the selected user known phone number as listed upon the blacklist manager database; and displaying the true caller ID of the incoming phone call or in the alternative automatically processing the incoming phone call so that the user cannot accessing the incoming phone call through the user's portable telecommunication smart device.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 1 is substantially a schematic flowchart showing the relationship of the portable telecommunication smart device, a downloaded software application, a telecommunication systems and the World Wide Web.

DESCRIPTION OF CERTAIN EMBODIMENTS OF THE PRESENT INVENTION

Figure 2:
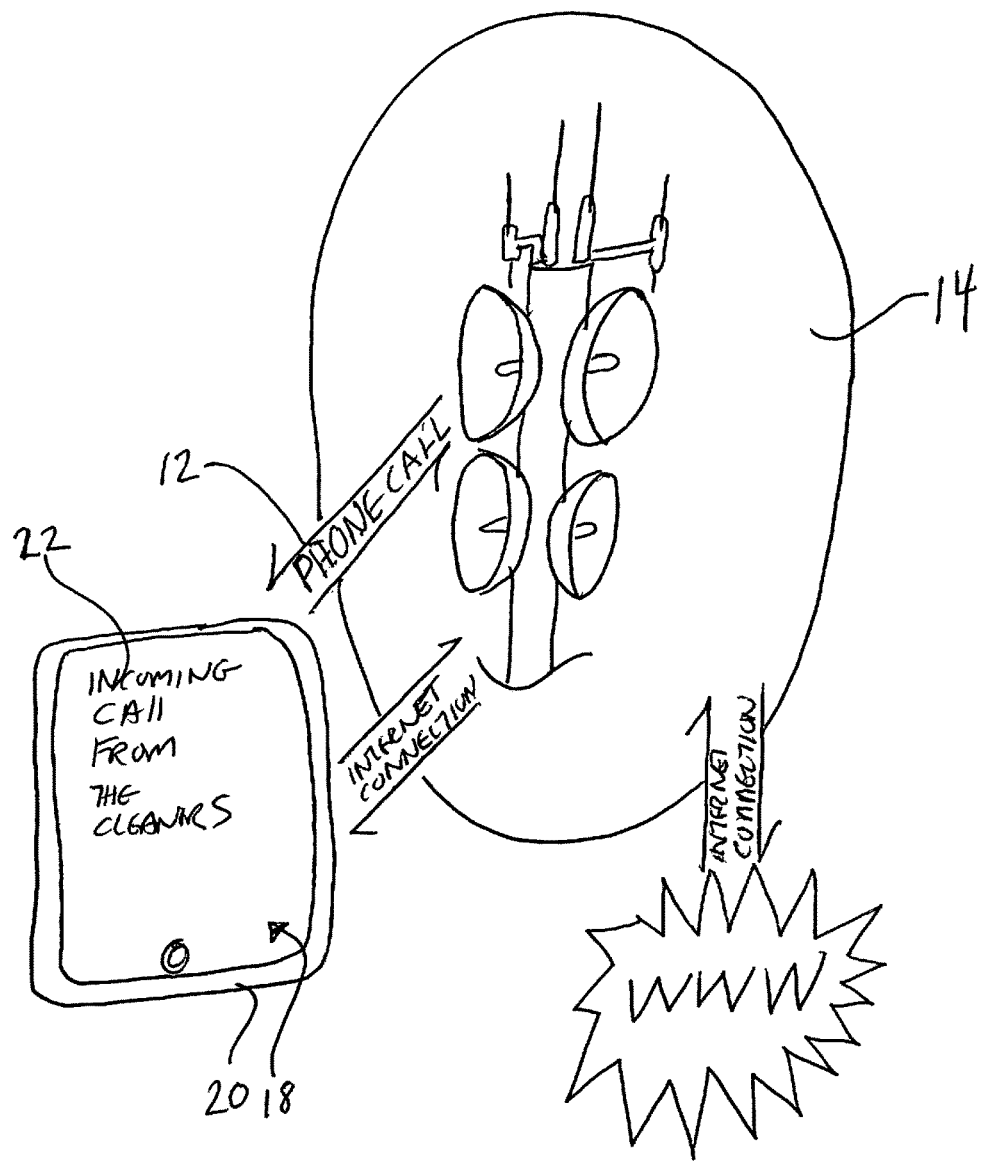
FIG. 2 is substantially a schematic flow chart of one version of an embodiment of the present invention for disguising the caller IDs of previously selected phone number as a received incoming phone call on a portable telecommunication smart device.
Figure 2:
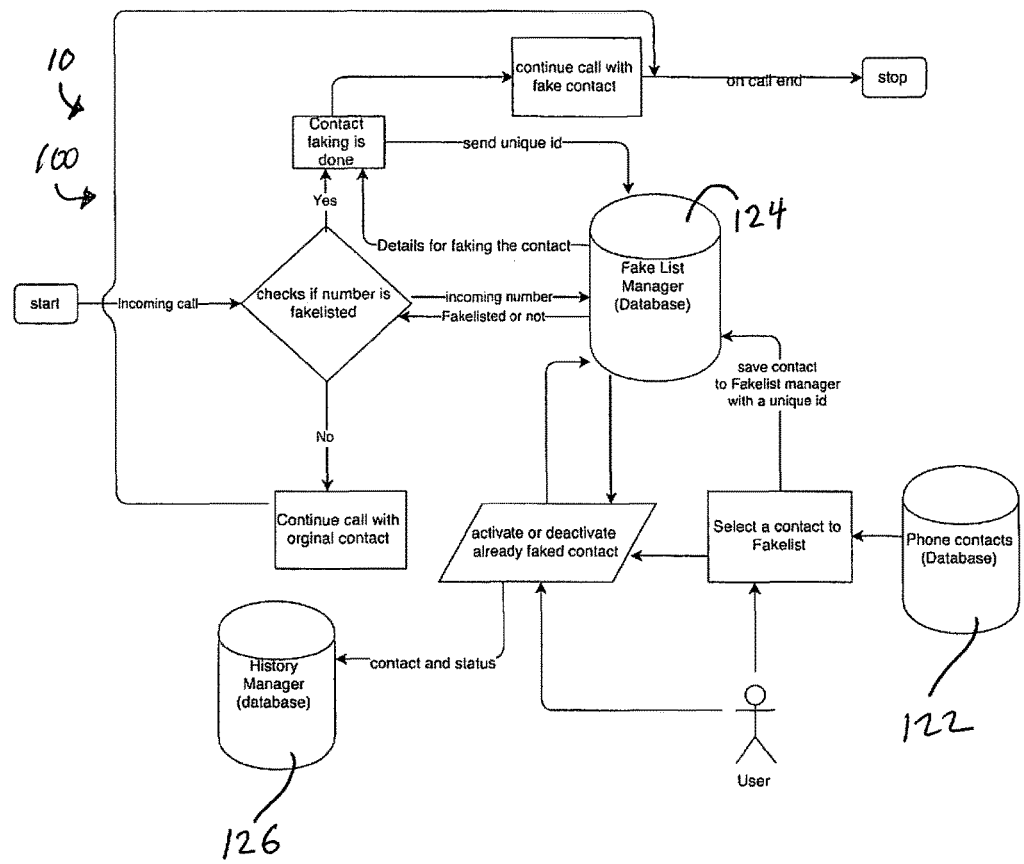

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention. The descriptions and illustration herein sets forth, rather broadly, a summary of one or more embodiments of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

Figure 3:
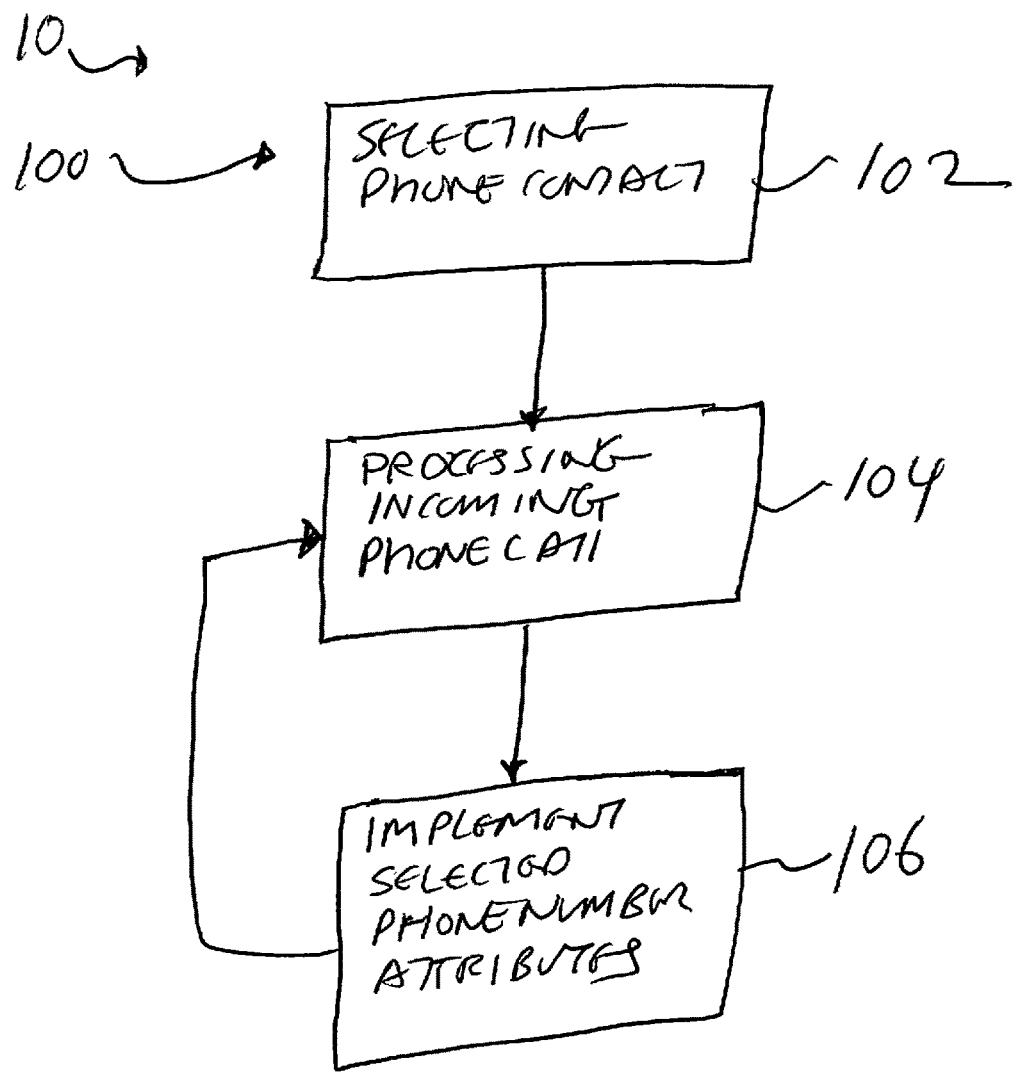
FIG. 3 is substantially a flowchart of one version of an embodiment of the present invention for disguising the caller IDs of a previously selected phone number as a received incoming phone call on a portable telecommunication smart device.

In one possible embodiment of the invention, as substantially shown in FIGS. 1, 2 and 3, the invention 10 could utilize a portable telecommunication smart device 20 that can receive incoming phone calls 12 from a telecommunications system 14 and can further download through the World Wide Web 16 a software application 18 that can be stored and run upon the portable telecommunication smart device 20.

The invention 10 in one embodiment could comprise a first method 100 of operating the downloaded software wherein the user (not shown) selects a phone number known to the user (e.g., and previously loaded upon the portable telecommunication smart device 20) to create and assign to the selected phone number a fake caller ID or identity 22. The fake caller ID 22 could be displayed by the portable telecommunication smart device 20 when the incoming phone call 12 matches a user previously selected phone number stored through the software application 18. The displayed fake caller ID 22 as created by the user could be a made up phone number, tag, title or the like that only the user could discern the true identity of the incoming phone call 12. The user could then decide whether or not to answer the incoming phone call 12 based on the situational environment surrounding the user and the portable telecommunication smart device 20. Any on looking third parties (not shown) viewing the displayed fake caller ID 22 could be substantially prevented from discerning the true caller ID of the incoming phone call 12.

The first method 100 could start with step 102, selecting the phone contact. In this step the user (not shown) could access the phone contacts function of the portable telecommunication smart device 20 to select a known phone contact (e.g., phone number/true caller ID) previously stored phone contacts and their true caller ID information to be placed in the fake list manager database 122. The user could at this time generate a suitable fake caller ID 22 for the selected phone number and then assign the fake caller ID 22 to the selected phone number. Both the selected phone number and the assigned fake caller ID 22 could be stored on the fake list manager database 122. In other embodiments of the invention, a third selection could be assign to the selected phone number that of handling commands (not shown). Handling commands could be commands to the software application or program 12 wherein upon receipt of an incoming phone call 12 whose phone number matches a previously selected and stored phone number, the handling command could cause the software application 18 to carry out additional tasks beyond not allowing the user to answer the incoming phone call 12 such as giving the originator of the incoming phone call a message (e.g., voice message, text message or the like) such as that the user is unable to answer the phone; sending the incoming phone call 12 to voice mail, or otherwise further process the incoming phone call 12 in addition to displaying the assigned fake caller ID 22 on the portable telecommunication smart device 20.

The user could then determine the status of the combination of the selected phone number and the assigned fake caller ID. If the user selects the active status for the combination then the system upon receiving an incoming phone call 12 with a phone number that matches the selected phone number could cause the portable telecommunication smart device 22 to display the fake caller ID 22 instead of the true caller ID or identity of the incoming phone. The true caller ID being hidden or otherwise not visually presented to the user during the incoming phone call. If the user selects deactivated status, the selected phone number and assigned fake caller ID 22 generally are not removed from the fake list manager database 124 (although other versions of the invention 10 could allow for such removal from the fake list manager database 124 or allow changes in the assigned fake caller ID 22, the selected phone number or both.) Upon receipt of an incoming phone number 12 that matches a phone number of a deactivated combination, the invention 10 could allow the true caller ID of the incoming phone call 12 to be visually presented by the portable telecommunication smart device 20 to the user and any on looking third parties. The fake caller ID 22 generally would not be visually presented by the portable telecommunication smart device 20 at this time. The selection of activation or deactivation status can stored and accessed by the software program 18 on the history manager database 126. As this step substantially completed, the first method 100 could proceed to the next step 104, processing the incoming phone call.

In this step 104, processing the incoming phone call, an incoming phone call 12 could be sent through the telecommunications system 14 to the portable telecommunication smart device 20. The portable telecommunication smart device 20 upon receipt of the incoming phone call 12 could extract the phone number of the incoming phone call 12 and compare the extracted phone number to the previously selected phone numbers as listed upon the fake list manager database 124. If the incoming phone call's phone number did not match any of the listed previously selected phone numbers (e.g., the incoming phone call's phone number was numerically different from the listed selected phone numbers) or the incoming phone call did not present a phone number (e.g., the true caller ID was blocked with a corresponding message such as "private number", "unlisted number" or the like) then the invention 10 could process the incoming phone call 12 as an ordinary phone call and the portable telecommunication smart device 20 could visually display the incoming phone number or associated call message (e.g., true caller ID.) No fake caller ID would be employed or displayed by the portable telecommunication smart device 20 at that time.

If there was a match between the phone number of the incoming phone call and a previously selected phone number found on the Fake List Manager Database generally the software application 18 could access the fake list manager database 124 to query the assigned fake caller ID 22, the associated handling command(s) (not shown) and other phone call handling attributes associated with the previously selected phone number. The software application could implement as needed the retrieved assigned fake caller ID 22, associated handling command(s) and other phone call handling attributes associated with the selected phone number. Upon substantial completion of this step, the method 100 could proceed to step 106, implementing selected phone number attributes.

In step 106, implementing selected phone number attributes, the software application 18 for the incoming phone call 12 whose telephone number matched the selected phone number from fake list manager database 124 could cause the portable telecommunication smart device 20 not to display the true caller ID (if any) associated with the incoming phone call 12 but rather display the fake caller ID 22 associated with the previously selected phone number that matches up with the phone number of the incoming phone call 12. In addition to or instead of showing the fake caller ID 22, the software application 18 could act upon associated handling commands (not shown) to route the incoming phone call 12 to voice mail, send the originator a message (e.g., a voice message, text message or alike) and other phone handling actions. The user upon viewing the fake caller ID 22 could decide to answer or ignore the incoming phone call 12 (allowing the incoming phone call 12 to go to voice mail.) Upon termination of the incoming phone call, the history of the phone call 12 (e.g., selected phone number) can be stored upon history manager database 126 to be suitably accessed by the user. The method 100 could then generally reset to step 104 for processing another incoming phone call 12.

Figure 4:
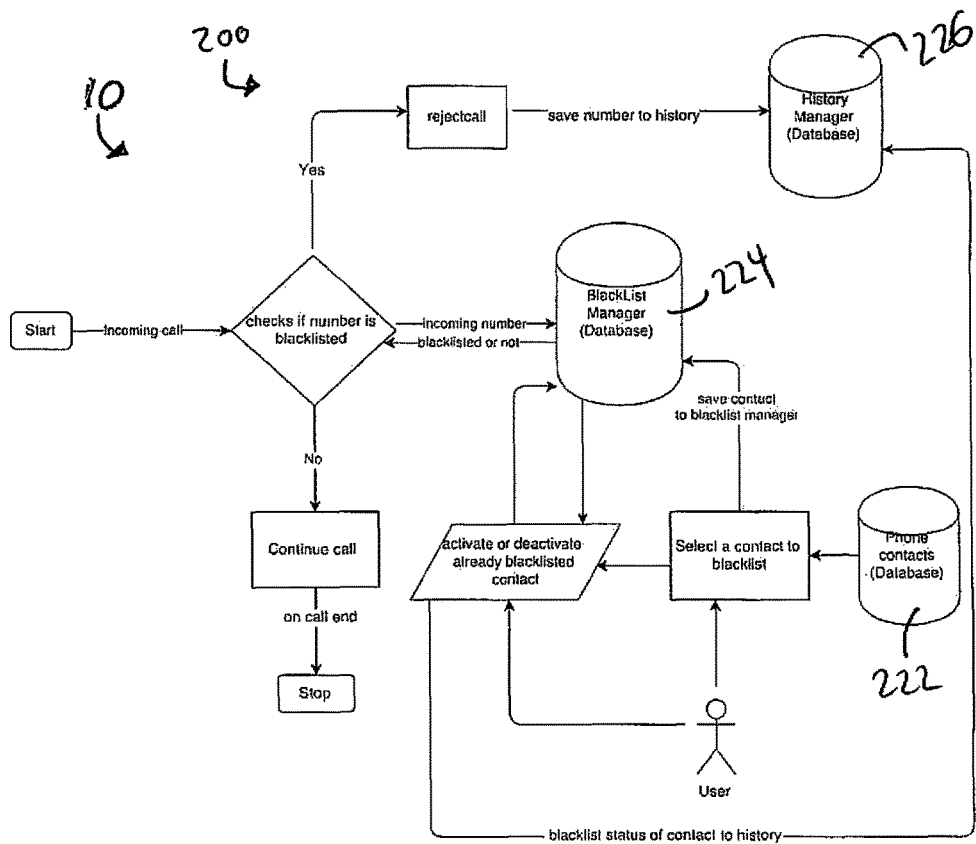
FIG. 4 is substantially a schematic flowchart view of one version of an embodiment of the present invention for preventing the display of any caller ID of previously selected phone numbers as incoming phone calls upon portable telecommunication smart device.
Figure 5:
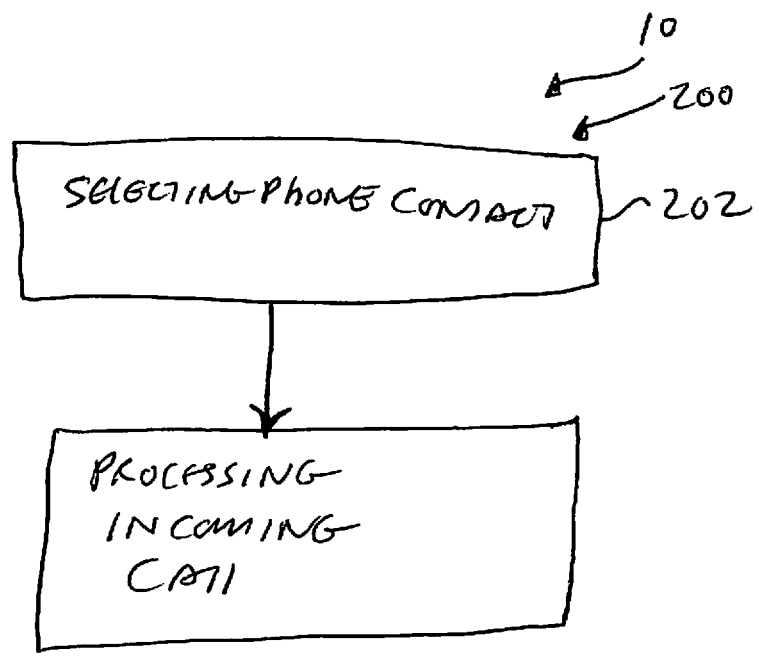
FIG. 5 is substantially a flowchart of one version of an embodiment of the present invention for preventing the display of any caller ID of previously selected phone numbers as incoming phone calls upon portable telecommunication smart device.

As substantially shown in FIGS. 4 and 5, and well as generally referencing FIG. 1, another possible embodiment of the invention 10 could be a second method 200 for operating a software application 18 that can downloaded, stored and run upon a portable telecommunication smart device 20 to screen incoming phone calls 12 for possible automatic rejection of certain incoming phone calls 12 based on a comparison of previously selected and stored phone numbers as listed on a phone contacts management database 222.

This embodiment of the invention 10 could be a method 200 that could start with step 202, selecting the phone contact. In this step 202, a user could access the phone contacts database 222 of the user's portable telecommunication smart device 20, the phone contacts database 222 generally storing a set of previously user known phone contacts and their true caller ID information. The user could then select a phone contact (e.g., phone number and any associated true phone ID, tag, name, etc.) and then determine the status of the selected phone number for the software application 18. If the user selects the active status for the selected use known phone number then when the portable telecommunication smart device 20 receives an incoming phone call 12 with a phone number that matches the selected user known phone number the portable telecommunication smart device 20 could automatically prevent the visual presentation of the true caller ID for the incoming phone call 12 as well as prevent the user form generally answering the incoming phone call 12.

If the user selects deactivated status, the selected phone number is generally not removed from the blacklist manager database 224 (although other versions of the invention could allow for such removal from the blacklist manager database 224.) Upon receipt of an incoming phone call 12 whose number that matches a deactivated selected user known phone number, the software application could allow the true caller ID of the incoming phone call 12 to be visually presented by the portable telecommunication smart device 12 to the user and any on looking third parties. The selection of activation or deactivation status for the previously selected phone number can stored and accessed by the software program on the history manager database 226. As this step 202 is substantially completed, the method 200 could proceed to the next step 204 processing the incoming phone call.

In this step 204, processing the incoming phone call, an incoming phone call 12 could be sent through the telecommunications system to the portable telecommunication smart device 20. The portable telecommunication smart device 20 upon receipt could extract the phone number of the incoming phone call 12 and compare the extracted phone number with the select phone numbers as listed upon the blacklist manager database 224. If the incoming phone number did not match any of the listed phone numbers (e.g., the incoming phone number was numerically different from the listed selected phone numbers) or the incoming phone call 12 did present any phone number (e.g., the true caller ID did not present a phone number or was otherwise replaced by a message such as "private number", "unlisted number" or the like) then the software application 18 could process the incoming phone call as an ordinary phone call and the portable telecommunication smart device could visually display the incoming phone number or associated call message (e.g., true caller ID.) Generally, no fake caller ID would be employed or displayed by the portable telecommunication smart device 20 in relation to a blocked incoming phone call as processed by the second method 200.

If there was a match between the phone number of the incoming phone call 12 and a selected user phone number then the software application 18 could automatically prevent the presentation of the true caller ID for the incoming phone call 12 by the portable telecommunication smart device 20. In one version, the software application 18 could do this by causing the telecommunication smart device 20 to automatically reject or terminate the incoming phone call 12. In another version, the software application 18 could do this by causing the incoming phone (e.g., route the incoming phoning call 12 into telecommunication smart device's voice message system.) In this automatic processing of the incoming phone call 12, the user may not know of the incoming phone call occurrence, the incoming phone call's true caller ID further not being displayed or otherwise hidden from the user (and any potential on looking third parties) during the automatic processing of the incoming phone call. After the incoming call as suitably processed, the invention could reset itself to screen and handing additional incoming phone calls 12. The user may have to routinely check the history manager database 226 to see what incoming phone calls were automatically processed by this second method 200.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A method of disguising a caller ID of a phone number of an incoming phone call as received by a portable telecommunication smart device comprising the following steps:
    (A) providing the portable telecommunication smart device that interfaces with a telecommunication system to handle incoming phone calls;
    (B) selecting a user known phone number as stored upon a phone contacts database of the portable telecommunication smart device;
    (C) creating a fake display caller ID to be assigned to the selected user known phone number, the fake display caller ID being unique to the selected user known phone number;
    (D) storing the combination of the selected user known phone number and the fake caller ID on a fake list manager database of the portable telecommunication smart device in a manner that assigns the fake caller ID to the selected user known phone number;
    (E) receiving the incoming phone call from a phone call originator from the telecommunications system by the portable telecommunication smart device;
    (F) comparing the phone number of the incoming phone call with the selected user known phone number as listed upon the fake list manager database;
    (G) displaying upon the portable telecommunication smart device of either the unique assigned fake caller ID associated with the incoming phone call, the unique assigned fake caller ID selected from a group of unique fake display caller IDs consisting of a phone number that is different from the phone number of incoming hone call: a made-up title that is different from a title used by the phone call originator; and a made-up tag that is different from a tag used by the phone call originator or in an alternative the true caller ID of the phone call originator as associated with the incoming phone call, the displaying of the unique assigned fake caller ID allowing the user to know the true identity of the phone call originator making the incoming phone; and
    (H) preventing one or more third parties when the one or more third parties overlook the display of the portable telecommunication smart device and view the display of the unique assigned faked caller ID from knowing the true identity of the phone call originator making the incoming phone call.

2. The method of claim 1 further comprises a step of answering the incoming phone call by the user further comprising a step of the user seeing as displayed by the portable telecommunication smart device the unique assigned fake caller ID or the true caller ID of the incoming phone call.

3. The method of claim 1 wherein the displaying the unique assigned fake caller ID further comprises a step of matching the phone number of the incoming phone call with the selected user known phone number as stored upon the fake list manager database.

4. The method of claim 1 wherein the displaying the unique assigned fake caller ID further comprises a step of requesting from the fake ID manager database the unique assigned fake caller display ID that is assigned with the selected user known phone number that matches the phone number of the incoming phone call.

5. The method of claim 1 further comprises a step of selecting activation status on the history manager database for the combination to allow the display of the unique assign fake caller ID upon receipt of the respective incoming phone call.

6. The method of claim 4 wherein the displaying a true caller ID associated with the incoming phone call further comprises a step of deactivating the selected user known phone number.

7. The method of claim 5 wherein the step of deactivating the selected user known phone number further comprises a step of allowing the deactivated selected user known phone number to stay listed on the fake list manager database.

8. The method of claim 5 wherein the step of deactivating the selected user known phone number further comprising a step of allowing the unique assigned fake caller ID to stay listed upon the fake list manager database.

9. The method of claim 1 further comprising of a step saving on the history manager database the selected user known phone number matching the phone number of an incoming phone call as processed by the portable telecommunication smart device.

10. The method of claim 1 wherein the unique assigned fake caller ID further comprises one or more of the following fake information IDs consisting of a made up phone number, a made up tag and a made up title that only the user could directly discern the true identity of the incoming phone call when the unique assigned fake caller ID is displayed upon the portable telecommunication smart device.

11. The method of claim 1 wherein the displaying by the unique assigned fake caller ID further comprises a step of implementing one or more phone call handling commands associated with the selected user known phone number.

12. The method of claim 11 wherein the step of implementing one or more phone call handling commands further comprises the step of automatically sending a message to an originator of the incoming phone call indicating that the user cannot answer the incoming phone call.

13. A method of handling a caller ID of an incoming phone number being received by a user's portable telecommunication smart device comprising the following steps:
(A) providing the user's portable telecommunication smart device that interfaces with telecommunication system to handle incoming phone calls;
(B) selecting a user known phone number stored upon the portable telecommunication smart device;
(C) storing the selected user known phone number on the blacklist manager database;
(D) receiving the incoming phone call of a phone call originator from the telecommunications system by the user's portable telecommunication smart device;
(E) comparing a phone number of the incoming phone call with the selected user known phone number as listed upon the blacklist manager database;
(F) displaying the true caller ID of the incoming phone call or in an alternative automatically processing the incoming phone call so that the user cannot use the user's portable telecommunication smart device to access the incoming phone call through or in an yet another alternative displaying a unique fake display caller ID selected from a group of unique fake display caller IDs consisting of a phone number that is different from the phone number of incoming phone call; a made-up title that is different from a title used by the phone call originator; and a made-up tag that is different from a tag used by the phone call originator that was previously assigned only to the incoming phone number, the unique fake display caller ID upon being seen by the user allows the user to directly discern the true identity of the phone call originator making the incoming phone call; and
(G) preventing one or more third parties when the one or more third parties overlook the display of the portable telecommunication smart device and view the display of the unique assigned faked caller ID from knowing the true identity of the phone call originator making the incoming phone call.

14. The method of claim 13 wherein the displaying the true caller ID of the incoming phone call further comprising a step of deactivating the selected user known phone number on the blacklist manager database that matches the phone number of the incoming phone call.

15. The method of claim 14 wherein the step of deactivating the selected user known phone number further comprises a step of allowing the deactivated selected user known phone number to stay listed on the blacklist manager database.

16. The method of claim 12 wherein the automatically processing the incoming phone call further comprises a step of activating the selected user known phone number.

17. The method of claim 12 wherein the automatically processing the incoming phone call further comprises a step of matching the phone number of the incoming phone call with an activated selected user known phone number.

18. The method of claim 12 wherein the automatically processing the incoming phone call further comprises a step of activating the selected user known phone number that stores the activation status on the history manager database.

19. The method of claim 12 further comprising a step of placing the phone number of the incoming call within a history manager data base of invention.

20. The method of claim 12 wherein the automatically processing the incoming phone call further comprises a step of sending the incoming phone call to voice mail.

* * * * *